Nov. 2, 1965  J. E. LANGAN  3,215,478
ELECTRICAL TIMING CIRCUIT
Filed Jan. 12, 1961
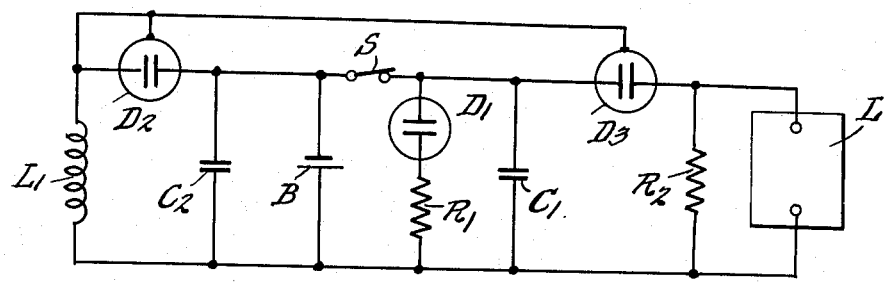
INVENTOR
Jeremiah E. Langan
BY Watson, Cole, Grindle & Watson
ATTORNEY United States Patent Office 3,215,478
Patented Nov. 2, 1965

3,215,478
ELECTRICAL TIMING CIRCUIT
Jeremiah E. Langan, Cresskill, N.J., assignor to Leesona Corporation, Cranston, R.I., a corporation of Massachusetts
Filed Jan. 12, 1961, Ser. No. 82,210
6 Claims. (Cl. 328—84)

This invention relates to timing circuits, and more particularly to an improved timing circuit which is switch controlled and is automatically reset unless the switch remains in the transferred state for the total time interval.

Resettable timing circuits are well known in the art. Most of these known circuits require a single switch operation, i.e., from closed to open, or vice versa. The prior art systems, however, require a switch to be operated by an external transducer wherein the switch may not remain in the transferred state for the duration of the timing interval. In such an event, the timing action will be terminated, the device must automatically be reset to the zero position and await a second switch transfer. Such a system exhibits certain disadvantages since it is often desired that the switch remain in its transferred state for the total timing interval. Further, certain of these prior art systems are incapable of being actuated repeatedly over an indefinite period.

Accordingly, it is an object of this invention to provide an improved timing circuit.

It is another object of this invention to provide an improved timing circuit having an operation which may be repeated indefinitely.

It is another object of this invention to provide an improved timing circuit in which the timing action may be repeated indefinitely and in which the timing action is completed even though the switch remains in the transferred state for the total timing interval.

Briefly, in accordance with aspects of this invention, a nuclear battery, which is a constant current source, is employed to store an electrical charge on a pair of capacitors. A voltage regulating circuit is connected in parallel with the capacitors when the circuit is in its quiescent state and maintains these charges at a predetermined fixed value. A load is connected in series with one of the capacitors by means of a cold cathode gas diode. A triggering circuit for this cold cathode diode is connected to the other of the capacitors and the triggering circuit is actuated when a switch between the two capacitors is opened. This triggering circuit includes a second cold cathode diode and an inductance serially connected to define a parallel path across the other of the capacitors.

These and various other objects and features of this invention will be more clearly understood from a reading of the detailed description of this invention in conjunction with the drawing which is a schematic illustration of one illustrative embodiment of this invention.

Referring now to the drawing, there is depicted a nuclear battery powered timing circuit in which $C_1$ and $C_2$ are a pair of storage capacitors. A nuclear battery B which, for convenience is shown as a single cell, is connected in parallel with capacitor $C_2$ and is also connected through switch S in parallel with capacitor $C_1$. A voltage regulator circuit is connected in parallel with capacitor $C_1$ and includes a cold cathode diode $D_1$ and a resistor $R_1$. A load L is connected in parallel with capacitor $C_1$ through a cold cathode diode $D_3$. A resistor $R_2$ is connected in parallel with load L to maintain partial ionization of cold cathode diode $D_3$ at all times when the load L is not connected. An inductance $L_1$ is connected in parallel with capacitor $C_2$ through cold cathode diode $D_2$ forming a damped oscillation circuit. A triggering circuit is connected to the damped oscillation circuit and includes inductance $L_1$, the triggering electrode of diodes $D_2$ and $D_3$ which are connected intermediate the inductance $L_1$ and the cold cathode diode $D_2$. The circuit operation may best be described in terms of its quiescent and dynamic conditions.

In its quiescent condition the switch S is closed and the battery B charges capacitors $C_1$ and $C_2$ at a predetermined constant rate. This charge will increase until the voltage attains a value equal to the striking potential of the cold cathode diode $D_1$. At this potential diode $D_1$ will conduct and the resulting current will develop a voltage across resistor $R_1$. The potential across $D_1$ will now decrease due to the current flow through resistor $R_1$, causing diode $D_1$ to be extinguished. The extinction of diode $D_1$ interrupts the current flow through the voltage regulator circuit and again permits the striking or ignition potential to develop across diode $D_1$. This voltage regulating action is repeated indefinitely and serves to maintain a fixed potential on capacitors $C_1$ and $C_2$. This potential will be referred to throughout this specification as the regulating voltage $E_r$ of the circuit. Advantageously the ignition potentials of diodes $D_2$ and $D_3$ are above $E_r$ and therefore pass no current when the quiescent condition prevails.

The dynamic conditions prevail when switch S is open thus removing the regulating circuit from the circuit including the nuclear battery B and capacitor $C_2$. The potential across capacitor $C_2$ may now increase until the ignition potential of diode $D_2$ is attained. The period of time required for the battery B to raise the potential across capacitor $C_2$ from the regulating potential $E_r$ to the striking or ignition potential of diode $D_2$ is the timing interval of the circuit. Capacitor $C_2$ will now discharge through diode $D_2$ and inductance $L_1$ to produce a damped oscillation, or trigger signal in the triggering loop. The triggering loop includes the trigger electrode of diodes $D_2$ and $D_3$. When the trigger signal is applied to the trigger electrode of diode $D_3$, the ignition potential of diode $D_3$ is reduced to a value well below the potential across capacitor $C_1$. Under these conditions capacitor $C_1$ discharges through diode $D_3$ and delivers the stored energy to the load L.

The timing interval may be varied by the selection of different values for the capacitor $C_2$ and the difference between the striking potential of diodes $D_2$ and $D_1$. The lower limit is imposed by the minimum energy available on capacitor $C_2$ for a reliable trigger signal. This limit may be extended or decreased by the proper physical orientation of diode $D_2$ adjacent the diode $D_3$. The visible light produced by diode $D_2$ in response to the trigger signal will thus illuminate the gas in diode $D_3$. This partial ionization decreases the ignition time of diode $D_3$ thereby permitting reliable trigger action from a damped oscillation of much less energy.

Advantageously, this timing action may be repeated indefinitely as the energy cannot be delivered unless the switch remains in the transferred state for the total timing interval. If the switch S is restored to its closed condition before the end of the timing interval the voltage regulator circuit $D_1$, $R_1$ reduces the potential across capacitor $C_2$ so that triggering of the diode $D_2$ cannot take place and the circuit is reset. Also advantageously, this timing circuit will deliver a predetermined fixed quantity of electrical energy to any load L and is therefore a charge metering circuit. This energy will be a single surge for resistive or capacitive loads or a damped oscillation for inductive loads. The timing action begins when switch S is open and terminates with the discharge of capacitor $C_1$.

While I have shown and described one illustrative embodiment of this invention, it is understood that the features thereof may be incorporated in other embodiments without departing from the spirit and scope of this invention.

What is claimed is:

1. A timing circuit operable to deliver an output signal to a load circuit after a predetermined time period responsive to the operation of switching means which resides in an operation state for the entire time period, comprising in combination, a voltage source, voltage regulator means for stabilizing the voltage from said source, a switch selectively coupling the voltage source to the regulator means, a first capacitor shunting said regulator means for supplying current to said load circuit, a triggerable switching device coupling said capacitor to said load circuit, and a circuit for triggering said switching device when said switch is in its open circuit condition comprising a second capacitor coupled in shunt with said source and a threshold switching device operable by said second capacitor at a voltage threshold above that established by said regulator means and coupled to trigger said triggerable switching device, thereby delivering the charge on the first said capacitor to said load.

2. A timing circuit according to claim 1 wherein said switching devices are gas diodes, each including a triggering electrode and wherein said triggering electrodes are connected together.

3. A timing circuit as defined in claim 2 wherein the threshold switching device is coupled across said second capacitor through an inductance and said triggering electrodes are coupled between said threshold device and said inductance.

4. A timing circuit comprising a constant current source, an electrical energy storage circuit including regulation means for stabilizing the quantity of energy stored, circuit opening switch means selectively coupling said source to said storage circuit, a load circuit, a gaseous discharge device having a trigger electrode coupling said load circuit to said energy storage circuit and blocking energy flow to said load from the storage circuit until triggered, and means for triggering said device responsive to a change in energy from said current source when said switch means opens the circuit coupling said source to said storage circuit, the last said means being coupled to the trigger electrode to release energy from the storage circuit to said load.

5. A timing circuit according to claim 4 wherein said means for triggering said gaseous discharge device comprises a capacitor connected in parallel with said source, a second gaseous discharge device connected to said capacitor and to said first-mentioned gaseous discharge device and an inductance connected between said second gaseous discharge device and said capacitor.

6. A timing circuit as defined in claim 4 wherein the means for triggering said device comprises a capacitor connected in parallel with said source, a gaseous threshold device having a threshold above the regulated level from said source when said switch means is closed and below the level of the current source when said switch means is open, and a circuit coupling said threshold device to said trigger electrode.

References Cited by the Examiner

UNITED STATES PATENTS

| 2,071,985 | 2/37 | Watrous | 328—67 X |
| 2,355,633 | 8/44 | Dawson | 328—77 X |
| 2,958,773 | 11/60 | Langan | 328—78 |
| 3,005,942 | 10/61 | Perdreaux | 320—1 |
| 3,011,096 | 11/61 | Wallack et al. | 328—78 X |

ARTHUR GAUSS, *Primary Examiner.*

GEORGE N. WESTBY, *Examiner.*